(12) United States Patent
Thubert et al.

(10) Patent No.: US 7,656,857 B2
(45) Date of Patent: Feb. 2, 2010

(54) DIRECTED ACYCLIC GRAPH COMPUTATION BY ORIENTING SHORTEST PATH LINKS AND ALTERNATE PATH LINKS OBTAINED FROM SHORTEST PATH COMPUTATION

(75) Inventors: Pascal Thubert, La Colle sur Loup (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 11/251,765

(22) Filed: Oct. 18, 2005

(65) Prior Publication Data

US 2007/0086358 A1    Apr. 19, 2007

(51) Int. Cl.
*H04L 12/28* (2006.01)
(52) U.S. Cl. .................. 370/351; 370/238; 370/254; 370/400
(58) Field of Classification Search .......... None
See application file for complete search history.

(56) References Cited

U.S. PATENT DOCUMENTS

| 6,667,957 | B1 * | 12/2003 | Corson et al. ........... 370/238 |
| 2004/0081152 | A1 | 4/2004 | Thubert et al, Thubert et al. |
| 2005/0041591 | A1 * | 2/2005 | Duggi et al. ........... 370/238 |
| 2006/0140123 | A1 * | 6/2006 | Conner et al. ........... 370/238 |

OTHER PUBLICATIONS

U.S. Appl. No. 11/167,240, filed Jun. 28, 2005.
Johnson et al., "Mobility Support in IPv6", Network Working Group, Request for Comments: 3775, Jun. 2004.
Devarapalli et al., "Network Mobility (NEMO) Basic Support Protocol", Network Working Group, Request for Comments: 3963, Jan. 2005.
Baker, "An outsider's view of Manet" <draft-baker-manet-review-01> Network Working Group Internet Draft, Mar. 17, 2002.
Ernst et al., "Network Mobility Support Terminology" <draft-ernst-monet-terminology-00.txt> IETF Internet Draft. Feb. 2002.
Ernst et al.,"Network Mobility Support Terminology" <draft-ernst-monet-terminology-01.txt> IETF Internet Draft. Jul. 2002.

(Continued)

*Primary Examiner*—Daniel J Ryman
*Assistant Examiner*—Tito Pham
(74) *Attorney, Agent, or Firm*—Leon R. Turkevich

(57) ABSTRACT

Each network node in a network is configured for calculating a directed acyclic graph that provides at least one path from all the other network nodes toward the one network node. The network node performs a modified shortest path first calculation by identifying next-hop nodes adjacent to the network node, and orienting the link of each next-hop node toward itself (i.e., the origin). The network node also identifies secondary adjacent nodes, adjacent to each of the next hop nodes, and extends paths from next-hop nodes to the associated secondary adjacent nodes while orienting each of the links of the path between adjacent nodes and next-hop nodes toward the next hop nodes. The paths of the nodes form a directed acyclic graph from any other network node toward the origin, enabling distribution of the directed acyclic graph to the other network nodes for optimized reachability to the network node.

20 Claims, 15 Drawing Sheets

OTHER PUBLICATIONS

Thubert et al. "Nested Nemo Tree Discovery" <draft-thubert-tree-discovery-01.txt> NEMO Working group Internet Draft, Oct. 11, 2004.

Moy, "OSPF Version 2", Network Working Group Request for Comments: 2328, Apr. 1998.

Park et al., "A Highly Adaptive Distributed Routing Algorithm for Mobile Wireless Networks", Proceedings of IEEE Infocom '97, (1997).

Park et al., "A Highly Adaptive Distributed Routing Algorithm for Mobile Wireless Networks", Proceedings of IEEE INFOCOM '97, (1997) (Powerpoint Presentation by Xin Zhang).

* cited by examiner

| Path Cost | Node in K | Path ID | Node in N | |
|---|---|---|---|---|
| ~~1~~ | ~~0~~ | ~~L1~~ | ~~1~~ | — 24a |
| ~~1~~ | ~~0~~ | ~~L2~~ | ~~2~~ | — 24b |
| ~~1~~ | ~~0~~ | ~~L3~~ | ~~3~~ | — 24c |
| ~~1~~ | ~~0~~ | ~~L4~~ | ~~4~~ | — 24d |
| ~~1~~ | ~~0~~ | ~~L5~~ | ~~5~~ | — 24e |
| ~~2~~ | ~~0~~ | ~~L6~~ | ~~6~~ | — 24f |
| ~~2~~ | ~~0~~ | ~~L7~~ | ~~7~~ | — 24g |
| 2 | 0 | L1 + L21 | 2 | |
| 2 | 0 | L1 + L24 | 5 | |
| 2 | 0 | L3 + L24 | 4 | |
| ~~2~~ | ~~0~~ | ~~L4 + L8~~ | ~~8~~ | — 24h |
| ~~2~~ | ~~0~~ | ~~L4 + L12~~ | ~~9~~ | — 24i |
| 2 | 0 | L5 + L23 | 9 | |
| 3 | 0 | L9 | 9 | |
| 3 | 0 | L2 + L18 | 6 | |
| ~~3~~ | ~~0~~ | ~~L2 + L20~~ | ~~11~~ | — 24k |
| 3 | 0 | L3 + L15 | 8 | |
| ~~3~~ | ~~0~~ | ~~L5 + L10~~ | ~~10~~ | — 24j |
| 3 | 0 | L4 + L8 + L13 | 9 | |
| 4 | 0 | L1 + L22 | 11 | |
| 4 | 0 | L3 + L16 | 7 | |
| 4 | 0 | L6 + L17 | 7 | |
| 4 | 0 | L4 + L12 + L14 | 10 | |
| 4 | 0 | L5 + L10 + L11 | 11 | |
| 5 | 0 | L6 + L19 | 11 | |

Residual Candidates, 42 (Discarded)

Set C

Figure 3 (PRIOR ART)

| Path Cost | Source (Node in K) | Path ID | Destination (Node in K) | Set P |
|---|---|---|---|---|
| 1 | 0 | L1 | 1 | — 28a |
| 1 | 0 | L2 | 2 | — 28b |
| 1 | 0 | L3 | 3 | — 28c |
| 1 | 0 | L4 | 4 | — 28d |
| 1 | 0 | L5 | 5 | — 28e |
| 2 | 0 | L6 | 6 | — 28f |
| 2 | 0 | L7 | 7 | — 28g |
| 2 | 0 | L4 + L8 | 8 | — 28h |
| 2 | 0 | L4 + L12 | 9 | — 28i |
| 3 | 0 | L5 + L10 | 10 | — 28j |
| 3 | 0 | L2 + L20 | 11 | — 28k |

Figure 4 (PRIOR ART)

| Node [i] in N | Link ID | Metric | Direction (i from j) | Adj. Node [j] in N |
|---|---|---|---|---|
| 0 | L1 | 1 | 0-1 | 1 |
| 0 | L2 | 1 | 0-2 | 2 |
| 0 | L3 | 1 | 0-3 | 3 |
| 0 | L4 | 1 | 0-4 | 4 |
| 0 | L5 | 1 | 0-5 | 5 |
| 0 | L6 | 2 | 0-6 | 6 |
| 0 | L7 | 2 | 0-7 | 7 |
| 0 | L9 | 3 | 0-9 | 9 |
| 1 | L1 | 1 | 1-0 | 0 |
| 1 | L21 | 1 | 1-2 | 2 |
| 1 | L24 | 1 | 1-5 | 5 |
| 1 | L22 | 3 | 1-11 | 11 |
| 2 | L2 | 1 | 2-0 | 0 |
| 2 | L21 | 1 | 2-1 | 1 |
| 2 | L18 | 2 | 2-6 | 6 |
| 2 | L20 | 2 | 2-11 | 11 |
| 3 | L3 | 1 | 3-0 | 0 |
| 3 | L24 | 1 | 3-4 | 4 |
| 3 | L16 | 3 | 3-7 | 7 |
| 3 | L15 | 2 | 3-8 | 8 |
| 4 | L4 | 1 | 4-0 | 0 |
| 4 | L24 | 1 | 4-3 | 3 |
| 4 | L8 | 1 | 4-8 | 8 |
| 4 | L12 | 1 | 4-9 | 9 |
| 5 | L5 | 1 | 5-0 | 0 |
| 5 | L24 | 1 | 5-1 | 1 |
| 5 | L23 | 1 | 5-9 | 9 |
| 5 | L10 | 2 | 5-10 | 10 |
| 6 | L6 | 2 | 6-0 | 0 |
| 6 | L18 | 2 | 6-2 | 2 |
| 6 | L17 | 2 | 6-7 | 7 |
| 6 | L19 | 3 | 6-11 | 11 |
| 7 | L7 | 2 | 7-0 | 0 |
| 7 | L16 | 3 | 7-3 | 3 |
| 7 | L17 | 2 | 7-6 | 6 |
| 8 | L15 | 2 | 8-3 | 3 |
| 8 | L8 | 1 | 8-4 | 4 |
| 8 | L13 | 1 | 8-9 | 9 |
| 9 | L9 | 3 | 9-0 | 0 |
| 9 | L12 | 1 | 9-4 | 4 |
| 9 | L23 | 1 | 9-5 | 5 |
| 9 | L13 | 1 | 9-8 | 8 |
| 9 | L14 | 2 | 9-10 | 10 |
| 10 | L10 | 2 | 10-5 | 5 |
| 10 | L14 | 2 | 10-9 | 9 |
| 10 | L11 | 1 | 10-11 | 11 |
| 11 | L22 | 3 | 11-1 | 1 |
| 11 | L20 | 2 | 11-2 | 2 |
| 11 | L19 | 3 | 11-6 | 6 |
| 11 | L11 | 1 | 11-10 | 10 |

Figure 8

| Node [i] in N (DAG Dest.) | Link ID (All Directions Downstream Toward Origin Node 0) | Metric | Direction (i from j) | Adj. Node [j] in N (DAG Source) | Flag: Not Shortest (NS) |
|---|---|---|---|---|---|
| 0 | L1 | 1 | 0-1 | 1 | 92a |
| 0 | L2 | 1 | 0-2 | 2 | |
| 0 | L3 | 1 | 0-3 | 3 | |
| 0 | L4 | 1 | 0-4 | 4 | |
| 0 | L5 | 1 | 0-5 | 5 | |
| 0 | L6 | 2 | 0-6 | 6 | |
| 0 | L7 | 2 | 0-7 | 7 | |
| 0 | L1 + L21 | 2 | 0-1, 1-2 | 2 | NS |
| 0 | L1 + L24 | 2 | 0-1, 1-5 | 5 | NS |
| 0 | L3 + L24 | 2 | 0-3, 3-4 | 4 | NS |
| 0 | L4 + L8 | 2 | 0-4, 4-8 | 8 | |
| 0 | L4 + L12 | 2 | 0-4, 4-9 | 9 | |
| 0 | L5 + L23 | 2 | 0-5, 5-9 | 9 | NS |
| 0 | L9 | 3 | 0-9 | 9 | NS |
| 0 | L2 + L18 | 3 | 0-2, 2-6 | 6 | NS |
| 0 | L2 + L20 | 3 | 0-2, 2-11 | 11 | NS |
| 0 | L3 + L15 | 3 | 0-3, 3-8 | 8 | NS |
| 0 | L5 + L10 | 3 | 0-5, 5-10 | 10 | |
| 0 | L4 + L8 + L13 | 3 | 0-4, 4-8, 8-9 | 9 | NS |
| 0 | L1 + L22 | 4 | 0-1, 1-11 | 11 | |
| 0 | L3 + L16 | 4 | 0-3, 3-7 | 7 | NS |
| 0 | L6 + L17 | 4 | 0-6, 6-7 | 7 | NS |
| 0 | L4 + L12 + L14 | 4 | 0-4, 4-9, 9-10 | 10 | NS |
| 0 | L5 + L10 + L11 | 4 | 0-5, 5-10, 10-11 | 11 | NS |
| 0 | L6 + L19 | 5 | 0-6, 6-11 | 11 | NS |

Figure 9

| Node [i] in N (DAG Destination) | Link ID (All Directions Downstream Toward Origin Node 0) | Metric | Direction (i from j) | Adj. Node [j] in N (DAG Source) | |
|---|---|---|---|---|---|
| 0 | L1 | 1 | 0-1 | 1 ←—98a | ⎫ 58c |
| 0 | L2 | 1 | 0-2 | 2 | |
| 0 | L3 | 1 | 0-3 | 3 | |
| 0 | L4 | 1 | 0-4 | 4 | |
| 0 | L5 | 1 | 0-5 | 5 | |
| 0 | L6 | 2 | 0-6 | 6 | |
| 0 | L7 | 2 | 0-7 | 7 | |
| 0 | L4 + L8 | 2 | 0-4, 4-8 | 8 | |
| 0 | L4 + L12 | 2 | 0-4, 4-9 | 9 | |
| 0 | L5 + L10 | 3 | 0-5, 5-10 | 10 | |
| 0 | L1 + L22 | 4 | 0-1, 1-11 | 11 | |
| 0 | L1 + L21 | 2 | 0-1, 1-2 | 2 | ⎫ |
| 0 | L3 + L24 | 2 | 0-3, 3-4 | 4 | |
| 0 | L1 + L24 | 2 | 0-1, 1-5 | 5 | |
| 0 | L5 + L23 | 2 | 0-5, 5-9 | 9 | |
| 0 | L2 + L18 | 3 | 0-2, 2-6 | 6 | |
| 0 | L3 + L15 | 3 | 0-3, 3-8 | 8 | |
| 0 | L9 | 3 | 0-9 | 9 | |
| 0 | L2 + L20 | 3 | 0-2, 2-11 | 11 | ⎭ 58d |

DIRECTED ACYCLIC GRAPH COMPUTATION BY ORIENTING SHORTEST PATH LINKS AND ALTERNATE PATH LINKS OBTAINED FROM SHORTEST PATH COMPUTATION

BACKGROUND OF THE INVENTION

1. Field of the Invention

The present invention relates to routing protocols, in particular creation of a network topology according to a directed acyclic graph, for establishment of an ad hoc mobile network by mobile routers, where the routing protocols are optimized for minimal overhead for accommodating rapid topology changes in the ad hoc mobile network.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, including an Internet Draft by Thierry Ernst, entitled "Network Mobility Support Terminology", February 2002. An objective of NEMO is providing mobile nodes with protocols for establishing connectivity with a wide area network, such as the Internet. Thus, mobile routers have been used to establish a mobile network topology in order to route packets between the mobile network and the Internet via a gateway at an edge of the mobile network.

Unfortunately, existing Internet-based routing protocols that assume a persistent connection to a wide area network such as the Internet rely on the ability to aggregate reachability to IP nodes, where all nodes sharing a common network link (such as a link of a top level mobile router connecting to an attachment router on the Internet) share the same routing prefix. Such aggregation creates a hierarchy of network prefixes that enables scalability. However, such a hierarchy is not possible in ad hoc networks.

The IETF has a Mobile Ad-hoc Networks (MANET) Working Group that is working to develop standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET"(Mar. 17, 2002), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Existing MANET protocols focus on the internal connectivity within the unstable topology between mobile devices. MANET protocols can be divided into the following types: stateful (proactive); and stateless (reactive). Proactive MANET protocols distribute routing information throughout the MANET network, enabling the routers within the MANET network to store route information before a data packet needs to be routed; hence, a router determines how to forward a packet based on accessing routing information from an internal table. However, proactive protocols suffer the disadvantage of requiring update messages to update obsolete route entries: the necessity for update messages increases with a corresponding desire for an improvement in route optimization.

Proactive MANET protocols can be subdivided into two subtypes, or "families": Optimized Routing Approach (ORA), and Least Overhead Routing Approach (LORA). The ORA type protocols are similar to routing protocols used in the Internet, in that they stress maintaining the best states to maintain the shortest path routes, at the expense of requiring more control messages to exchange routes. An example of an ORA type routing protocol is Open Shortest Path First (OSPF) (as specified by the IETF Request for Comments (RFC) 2178), or Intermediate System-to-Intermediate System (IS-IS) protocol (specified by the International Organization for Standardization document ISO 10589). The OSPF protocol involves mobile routers sending link-state advertisements (LSAs) every 3600 sec, enabling resulting in substantial burdens in distributing the LSAs.

FIG. 1 is a diagram illustrating a conventional layer 2 mesh network 10 having multiple mobile routers (N0, N1, N2, N3, N4, . . . N11) interconnected by links (L1, L2, L3, L4, . . . L24) having respective metrics (i.e., costs). For example, the mobile routers N0 and N1 are directly connected via a link L1 (e.g., a wireless IEEE 802.11g link) having a cost of "1"; in contrast, the mobile routers N0 and N9 are directly connected via a wireless link L9 having a corresponding cost of "3". A routing protocol such as OSPF is needed in order for each mobile router (e.g., N0) to determine a path to a given destination (e.g., N11).

FIG. 2 is a diagram illustrating a Shortest Path First (SPF) routing protocol that is executed by a mobile router of FIG. 1 (e.g., N0) to establish a topology tree 12, illustrated in FIG. 5. SPF relies on a global synchronization of topology databases between the mobile routers, and a global understanding of the associated values metrics encountered by the different mobile routers: each mobile router (e.g., N0) computes a consistent loop less path towards each possible destination.

Hence, the topology tree 12 generated by the mobile router N0 enables the mobile router N0 to send packets to an identified destination (e.g., N11) via a shortest path (e.g., links L5 and L10). As described in detail below, the topology tree 12 is generated based on the SPF computation by the mobile router N0 preserving only the shortest path(s) to a given destination; in contrast, other routing protocols (e.g., BGP, EIGRP) can propose unequal cost load balancing.

As illustrated in FIG. 2, the mobile router (e.g., N0) executes the SPF routing protocol based on establishing in step 14 a network node set (N) that identifies the domain of nodes within the network 10 (i.e., N={N0, N1, N2, . . . N11}) based on received link state advertisement messages from nodes (e.g., N1, N2, . . . N11) throughout the network. The mobile router N0 also establishes in step 16 an adjacent node set A that identifies adjacent node pairs, link identifiers, and costs, based on the received link state advertisement messages from other nodes throughout the network 10. In particular, the adjacent node set A identifies nodes with potential adjacencies and includes, for every node[i] in N (e.g., N0), at least one adjacent node[j], a corresponding link identifier (e.g., L1), and a corresponding cost (i.e., metric) for the link (i.e., A={node[i] in N, {{node[i], link identifier, cost, node[j] in N}}}). Hence, the network node set N and the adjacent node set A represent the link state of the mesh network 10 of FIG. 1.

The mobile router N0 initializes the SPF computation in step 18 by initially inserting within a set K (defined as storing chosen nodes) only the mobile router N0 performing the computation (i.e., the "origin node") (N0 ∈ K), and emptying the set P that defines chosen paths (P={ }). The set P is configured for storing: path cost; the source node in K, the destination node in K, and the link identifier(s) between the source and destination nodes (i.e., P={path cost, {node in K, {identifier, node in K}*}}}).

The mobile router N0 also initializes in step 18 by initially populating a set C with paths of nodes that are adjacent to the origin node N0. A set C is defined as storing an ordered-by-path-cost of candidate paths C, and contains the following elements: path cost, source node in K, the destination node in N, and the link identifier(s) between the source and destination nodes (i.e., C={path cost, {node in K, {identifier, node in N}*}}}). Hence, the set C is initially populated with the paths from the mobile router N0 to the mobile routers N1, N2, N3, N4, N5, N6, N7, N9, as illustrated by the added entries 20 of FIG. 3. In particular, FIG. 3 is a diagram illustrating the insertion and deletion of candidate paths in set C during execution of the method of FIG. 2; hence, entries 20 are added to the empty set C in step 18.

The mobile router N0 begins the SPF computation in step 22 of FIG. 2 by selecting another node for SPF computation (i=1): the mobile router N0 begins by selecting an adjacent node (i.e., AN) as the next node for analysis (e.g., AN[i=1]=N1). The mobile router N0 selects and removes from the set C the least cost path (Least_Path[i]) for the selected adjacent node AN[i=1] (e.g., N1) in step 24, illustrated in FIG. 3 as the removal of the corresponding entry by the line 24a removing the entry for the link L1 between nodes N0 and N1 at a cost of "1"

If in step 26 of the selected adjacent node AN[i=1] (e.g., N1) is not already a member of the set K, the mobile router N0 adds in step 28 the selected adjacent node AN[i=1] to the set K of chosen nodes (N1 ∈ K), and adds the least cost path Least_Path[i] to the set P of FIG. 4, for example as entry 28a. The mobile router N0 then extends the path Least_Path[i] from the origin node N0 beyond the selected adjacent node AN[i=1] by adding in steps 30, 32, 34, 36, and 38 to the set C links to any secondary adjacent nodes (SAN) that are adjacent to the selected adjacent node AN[i=1] and that are not already members of the set K.

In particular, for each secondary adjacent node SAN[j] relative to the selected adjacent node AN[i=1] (e.g., N1), if in step 32 the secondary adjacent node SAN[j] (e.g., N2, N5, or N11) is not already in the set K, then: the path from the origin N0 to the selected adjacent node AN[i=1] (e.g., N1) is extended in step 34 to the secondary adjacent node SAN[j] by adding the corresponding link and cost for reaching the secondary adjacent node SAN[j]; the extended path is stored in step 36 in set C as a candidate path, and the steps 30, 32, 34, and 36 are repeated for the next secondary adjacent node. Hence, as illustrated in FIG. 3, the extension of the paths from the origin node N0 beyond the selected adjacent node AN[i=1] (e.g., N1) causes the addition of entries 36a for the secondary adjacent nodes (e.g., N2, N5, N11) associated with the selected adjacent node AN[i=1] (e.g., N1).

The mobile router N0 then repeats in step 40 the process for the next adjacent node AN[i=i+1] (e.g., N2), repeating steps 24, 26, 28, 28, 30, 32, 34, 36, and 38 for each of the nodes (N2, N3, N4, . . . N11). In particular, during computation of the node AN[i=2] (e.g., N2), the corresponding least cost path Least_Path[i=2] is deleted from set C in FIG. 3 in step 24 (event 24b) and added to set P of FIG. 4 in step 28 (entry 28b), and the extended paths for nodes SAN[j] (e.g., N6 and N11) are added to set C in step 36 (entries 36b).

The mobile router N0 repeats the above described steps for each of the nodes. Hence, during the calculations for the nodes N3, N4, N5, N6, N7, N8, N9, N10, and N11, the respective least cost path entries Least_Path[i] are deleted from set C at respective events 24c, 24d, 24e, 24f, 24g, 24h, 24i, 24j, and 24k, and added to set P as respective entries 28c, 28d, 28e, 28f, 28g, 28h, 28i, 28j, and 28k. In addition, the mobile router N0 adds the respective extended path entries 36c, 36d, 36e, 36f, 36h, 36j, and 36j to Set C for nodes N3, N4, N5, N6, N8, N9, and N10. Note that there are no extended entries for N7 (adjacent nodes N0, N3 and N6 already belong in set K) or N11 (adjacent nodes N1, N2, N6, and N10 already belong in set K).

After the mobile router N0 has completed steps 24-40 for the last node (i=N) (e.g., N11), such that the set P of FIG. 4 contains the shortest path entries 28a, 28b, . . . 28k for the respective nodes N1, N2, . . . N11, the mobile router N0 discards the residual candidate paths in step 42 as illustrated in FIGS. 2 and 3. Hence, the set P of FIG. 4, upon completion of the SPF method of FIG. 2, provides reachability to the other network nodes as illustrated by the shortest path tree 12 of FIG. 5.

Numerous problems arise from implementing a Shortest Path First technique as illustrated above, especially since the candidate paths are discarded. For example, there is no guarantee of service during the convergence time, when a topological or a metric change occurs and before every node has resynchronized by recalculating a new tree.

Further, each and every node needs to assess the cost metrics in a consistent manner, even though the requirements for each node may be different. For example, a personal router operating on battery may prefer to prioritize a next hop that is reachable at low power, whereas a mobile node with an unlimited power supply may prefer to use a next hop router that is reachable at a low error rate.

Link reversal routing has been suggested as a technique for providing multiple communications links between nodes in an ad hoc mobile network, where link reversal routing algorithms build a directed acyclic graph (DAG) for each possible destination: a directed graph is acyclic if it contains no cycle or loop, and the DAG maps to a given destination based on the destination having only incoming links: all other nodes that have incoming links also must have outgoing links. An example of a routing algorithm that builds a DAG is the Temporally-Ordered Routing Algorithm (TORA).

Existing DAG-based routing algorithms that permit multiple connections, such as TORA, still require substantial processing and overhead requirements that may increase convergence times in response to topology changes, limiting the ad hoc network to rapidly respond to topological changes. For example, TORA requires that a packet is broadcast to all of its neighbors, resulting in additional congestion in the ad hoc network and additional processing by each network node that receives a packet and determines that the packet should be dropped.

Hence, if a network node configured for determining optimized routing connections (e.g., using Shortest Path First computations) was configured to also perform link reversal routing (in addition to the SPF computations) in order to perform load balancing across multiple paths, the requirement of performing both SPF computations in conjunction with link reversal routing computations would result in substantially higher performance requirements for the network node, resulting in a loss of performance or a more costly node having the additional processing capacity to perform the substantially higher performance requirements.

SUMMARY OF THE INVENTION

There is a need for an arrangement that enables network nodes, for example mobile nodes in a mobile ad hoc network, that utilize optimized routing approach (ORA) protocols such as OSPF or IS-IS, to implement unequal cost load balancing with minimal added complexity.

There also is a need for an arrangement that enables network nodes to implement directed acyclic graphs in a economical and efficient manner.

These and other needs are attained by the present invention, where each network node in a network is configured for calculating a directed acyclic graph that provides at least one path from all the other network nodes toward the one network node. The network node performs a modified shortest path first calculation by identifying next-hop nodes adjacent to the network node, and orienting the link of each next-hop node toward itself (i.e., the origin). The network node also identifies secondary adjacent nodes that are adjacent to each of the next hop nodes, and extends paths from next-hop nodes to the associated secondary adjacent nodes while orienting each of the links of the path between adjacent nodes and next-hop nodes toward the next hop nodes. The entries that identify the paths of the nodes form a directed acyclic graph from any of the other network nodes toward the origin, enabling the network node to distribute the directed acyclic graph to the other network nodes for optimized reachability to the network node.

Hence, each network node can determine its own directed acyclic graph and distribute the directed acyclic graph, with minimal complexity relative to existing Shortest Path First computations.

One aspect of the present invention provides a method for creating a directed acyclic graph by a network node of a network. The method includes storing adjacent node entries identifying links to other network nodes in the network. Each adjacent node entry identifies first and second adjacent nodes of the network, the link connecting the corresponding first and second adjacent nodes, and a corresponding cost of the link. At least one of the adjacent node entries identifies the network node and a next-hop node that is adjacent to the network node. The method also includes adding, to a candidate path data structure, a first candidate path entry for each next-hop node and that specifies a first path to the corresponding next-hop node via the corresponding link at the corresponding cost, and orienting a link orientation of the corresponding link toward the network node. The method also includes selectively adding, for each next-hop node, a second candidate path entry to the candidate path data structure, for each secondary adjacent node that is adjacent to the corresponding one next-hop node; the second candidate path entry is added based on a determined absence of orientation of the corresponding link between the corresponding secondary adjacent node and the corresponding one next-hop node. The second candidate path entry specifies a corresponding extended path that extends the corresponding first path of the corresponding one next-hop node: the extended path is based on (1) adding the link and cost of the corresponding adjacent node entry specifying the secondary adjacent node and the corresponding one next-hop node with the respective link and cost of the corresponding first candidate entry, and (2) orienting the link connecting the secondary adjacent node and the corresponding one next-hop node toward the corresponding one next-hop node. The method also includes distributing the directed acyclic graph to the other network nodes for transmission of packets to the network node. The directed acyclic graph identifies every one of the other nodes based on the first paths, the extended paths, and the oriented links.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 is a (prior art) diagram illustrating a candidate path set used during the shortest path computation of FIG. 2.

FIG. 4 is a (prior art) diagram illustrating a chosen path set that stores the result of the shortest path first computation of FIG. 2.

FIG. 8 is a diagram illustrating a node adjacency set stored by the network node of FIG. 6 and identifying adjacent node pairs, link identifiers and costs, and link direction, according to an embodiment of the present invention.

FIG. 9 is a diagram illustrating a candidate path set generated according to the method of FIG. 7 and forming a directed acyclic graph, according to an embodiment of the present invention.

FIG. 10 is a diagram illustrating optional data structures used to describe the directed acyclic graph generated according to the method of FIG. 7, based on ordering paths relative to cost and network node identifier.

BEST MODE FOR CARRYING OUT THE INVENTION

Figure 1:
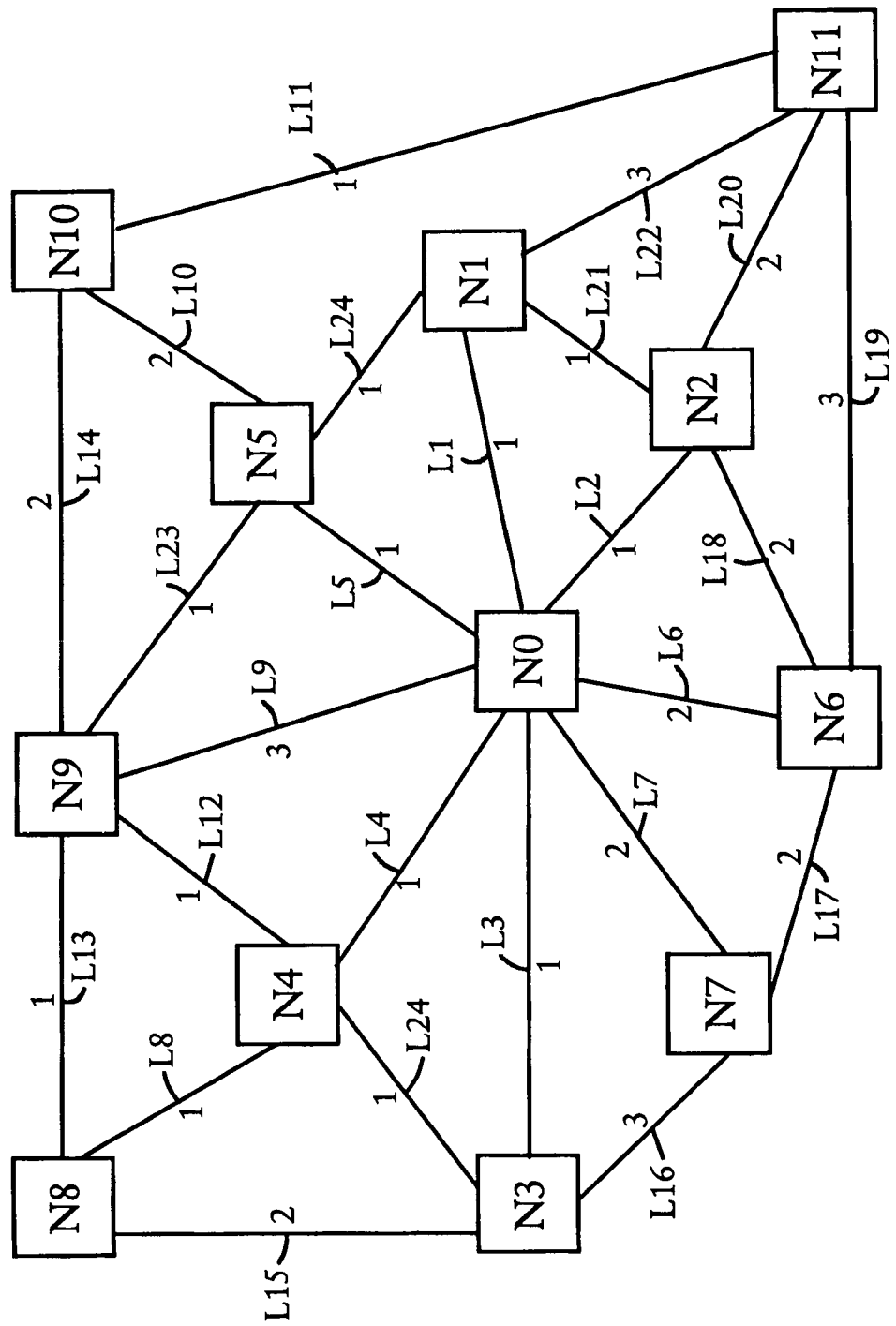
FIG. 1 is a (prior art) diagram illustrating a conventional mesh network composed of multiple network nodes connected via multiple links.
Figure 6:
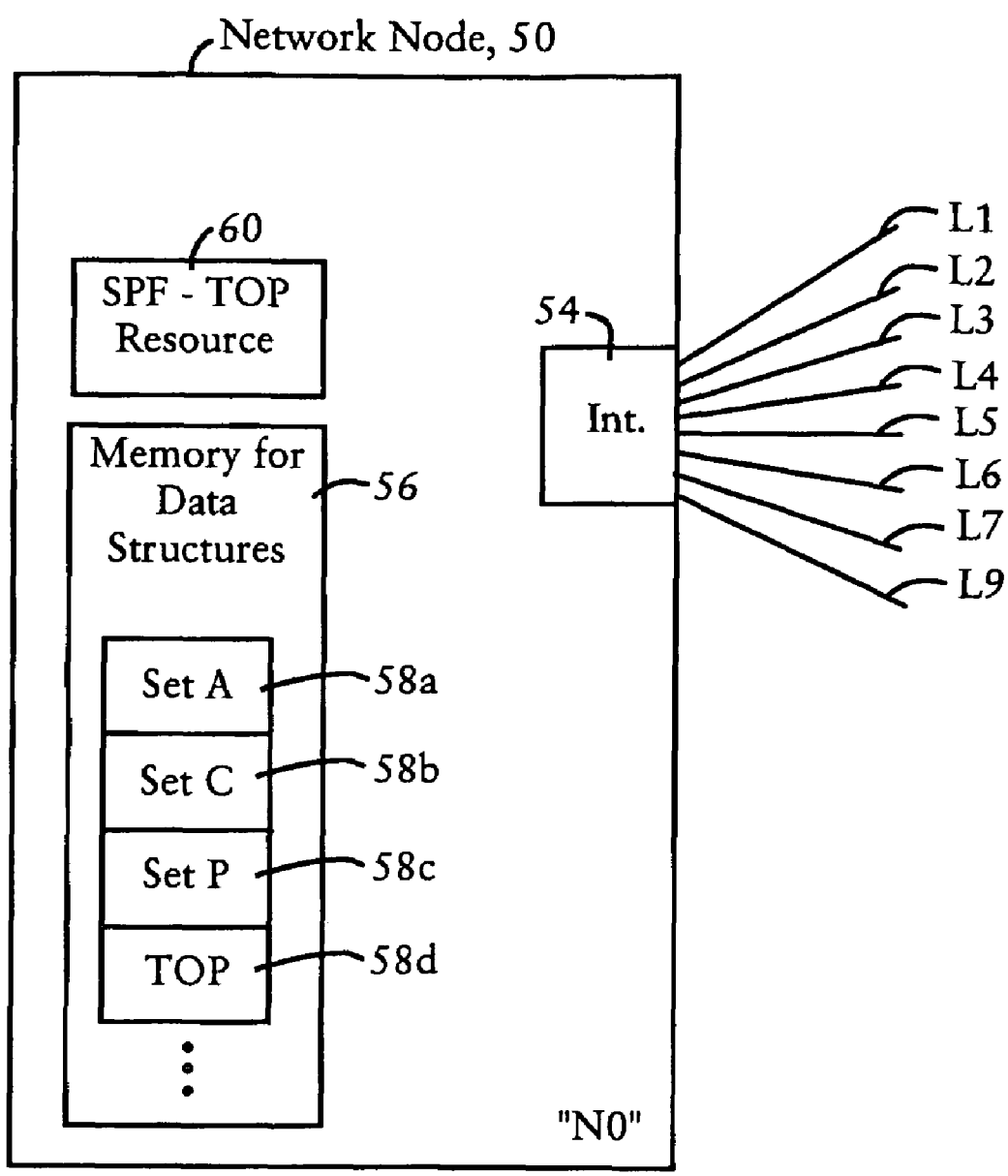
FIG. 6 is a diagram illustrating a network node configured for calculating a directed acyclic graph based on orienting links for next hop paths and extended paths toward the network node, according to an embodiment of the present invention.
Figure 11A:
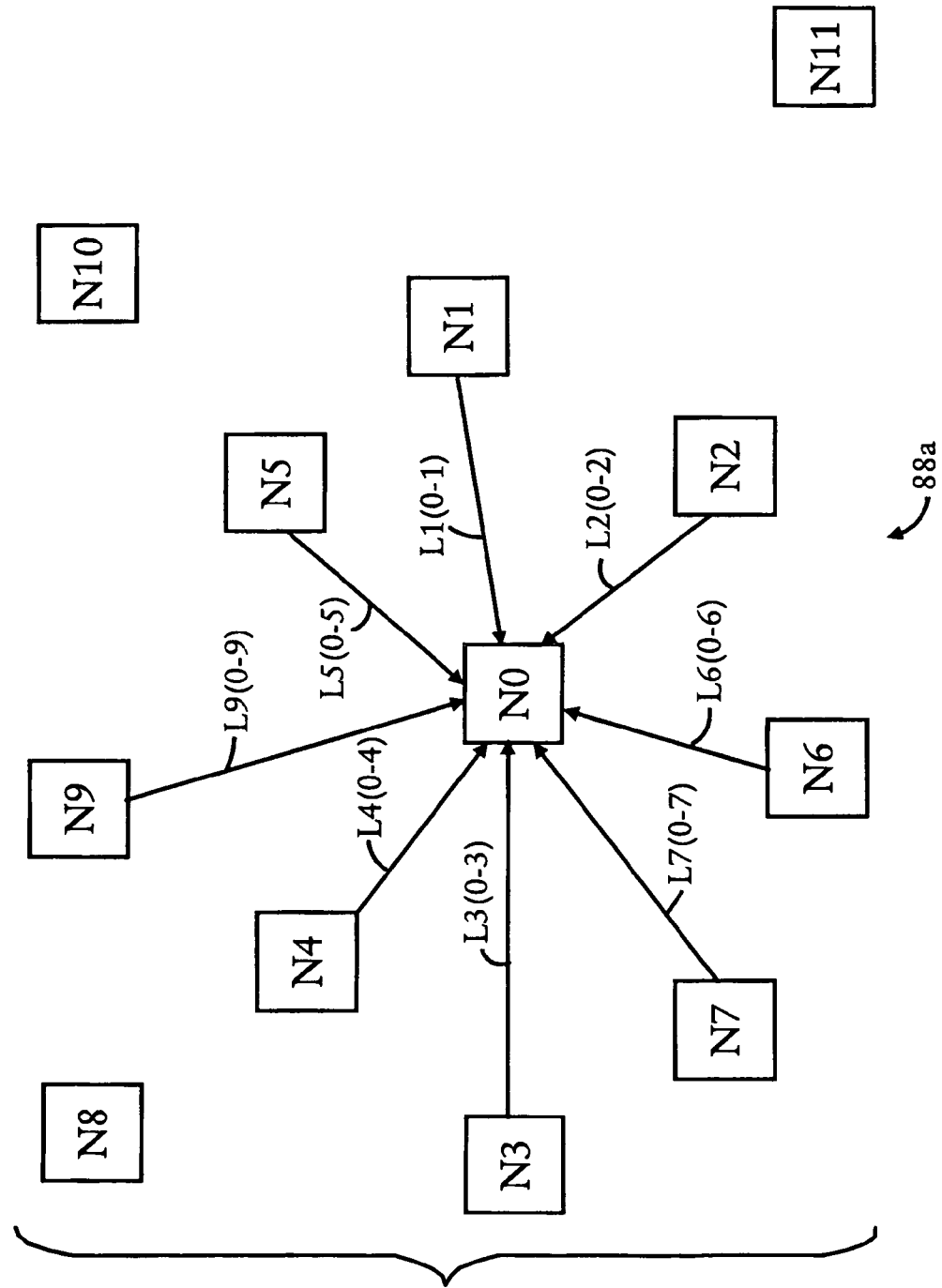
FIGS. 11A-11F are diagrams illustrating in sequence creation of the directed acyclic graph from the mesh network of FIG. 1, according to the method of FIG. 7.
Figure 11B:
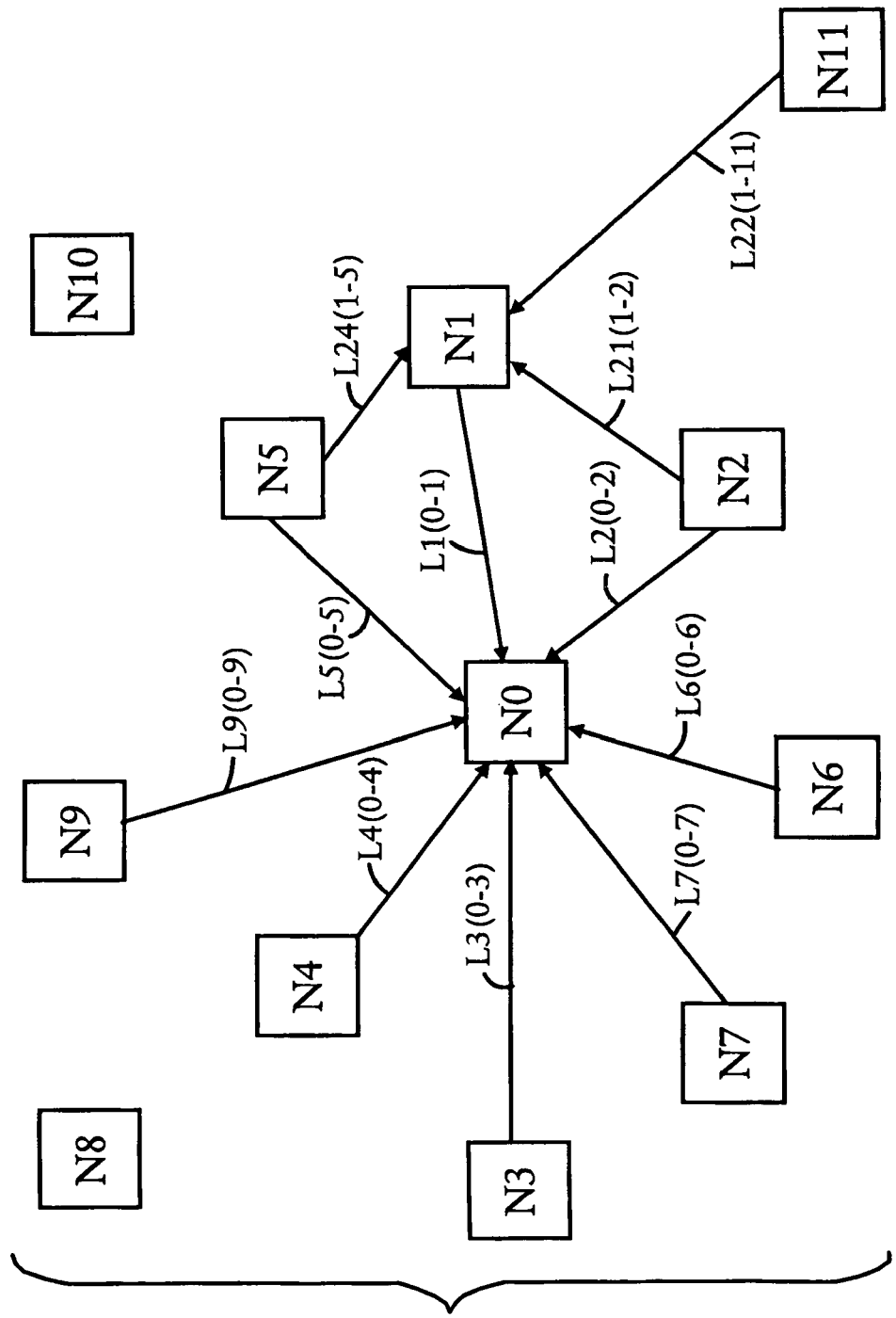
Figure 11C:
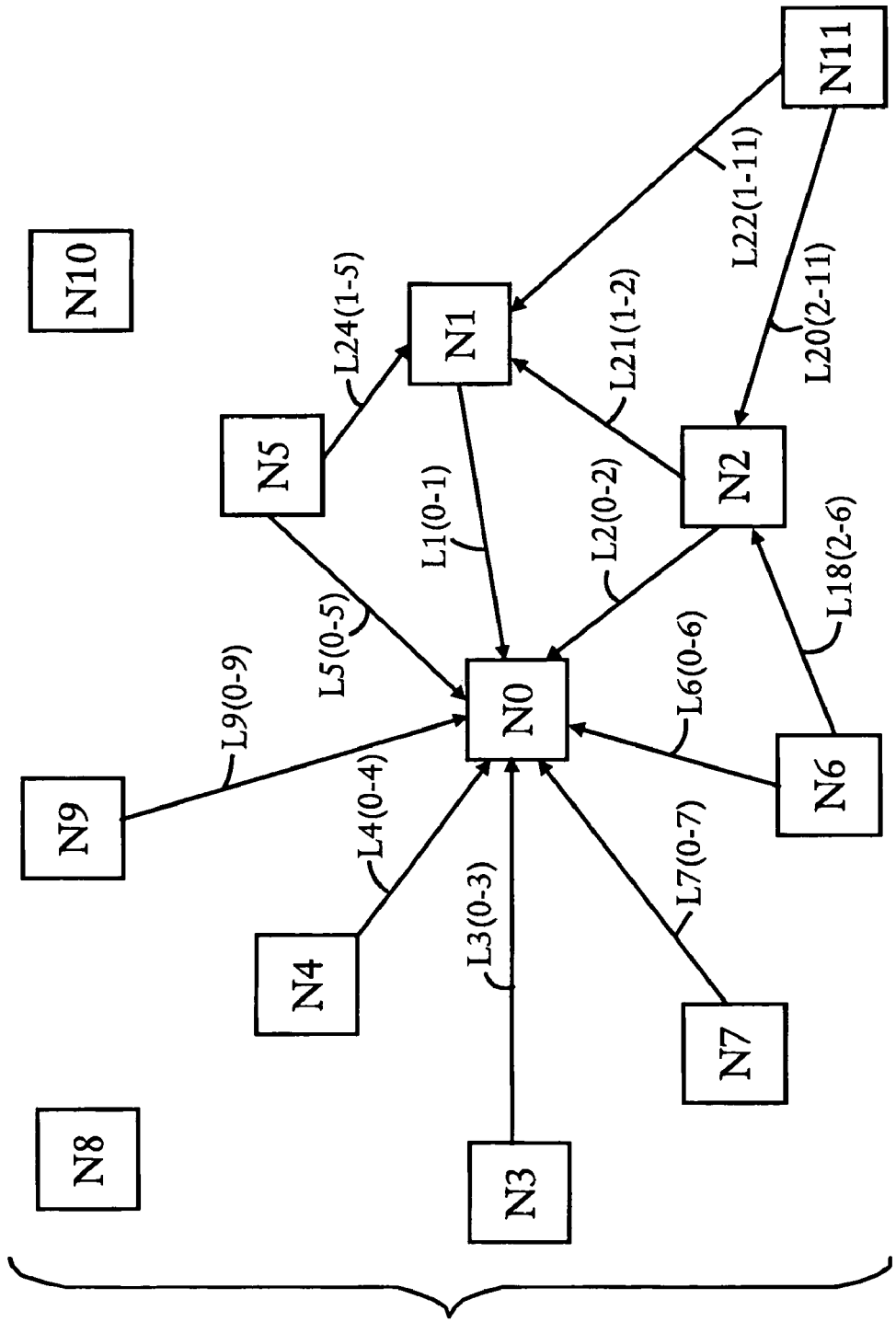
Figure 11D:
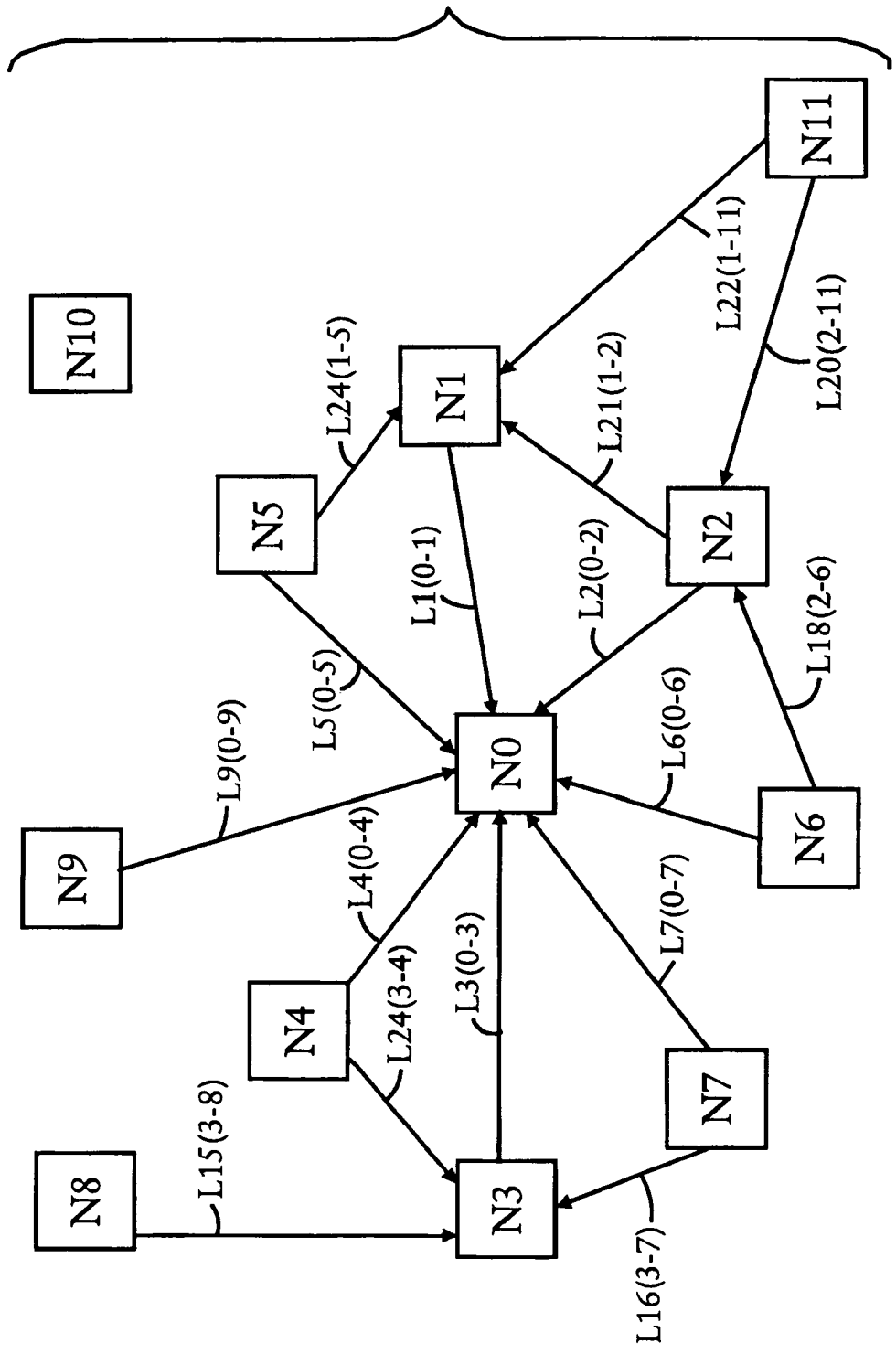
Figure 11E:
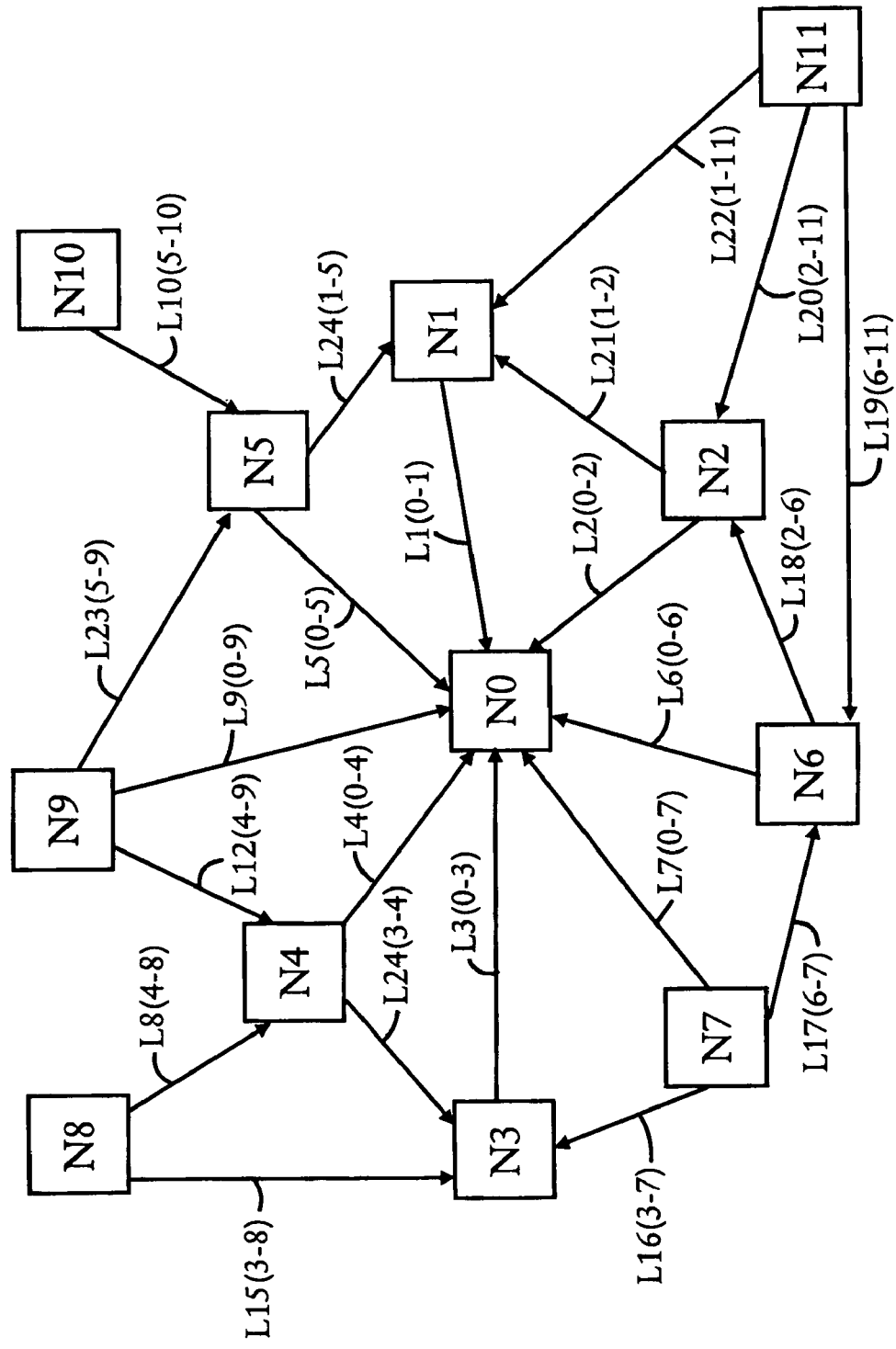
Figure 11F:
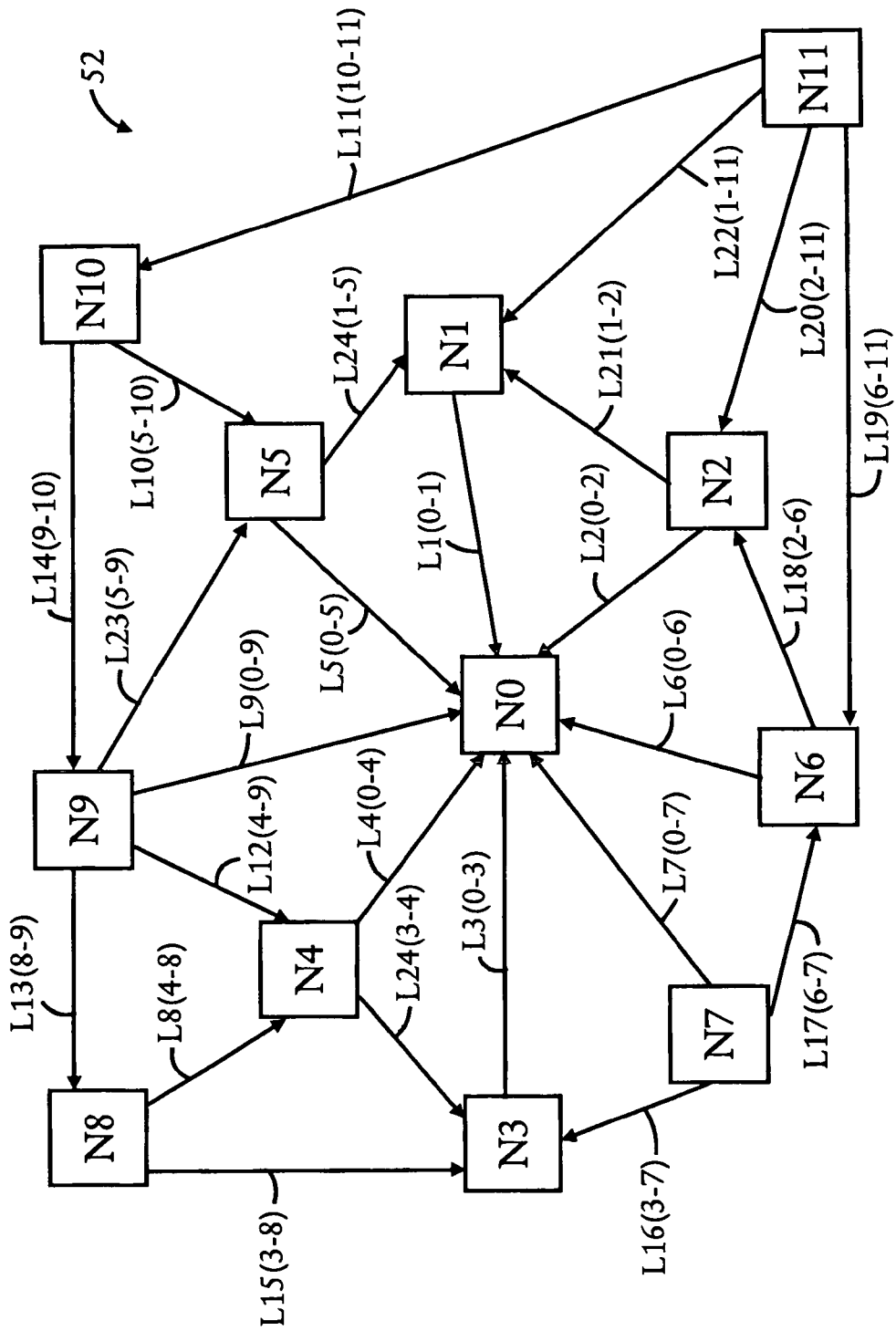

FIG. 6 is a diagram illustrating a network node 50 configured for creating a directed acyclic graph 52, illustrated in FIG. 11F, based on orienting links for the next hop paths and extended paths for the network node, according to an embodiment of the present invention. The network node 50, implemented for example as a mobile node or a mobile router configured for executing mobile protocols such as Mobile IP or MANET-based protocols including Open Shortest Path First (OSPF), includes an IP based interface 54 for sending and receiving data packets onto the network 10 of FIG. 1 via a connected link such as a wireless link. As illustrated in FIG. 6, the network node 50 is illustrated as the origin node "N0" within the mesh topology 10 of FIG. 1, hence the network node 50 is in communication with next-hop nodes N1, N2, N3, N4, N5, N6, N7, and N9 via respective links L1, L2, L3, L4, L5, L6, L7, and L9.

The network node 50 also includes a memory structure 56, for example a nonvolatile random access memory (RAM) configured for storing network data, including a node adjacency set (Set A) 58a, a candidate path set (Set C) 58b, and optionally a shortest path tree set (Set P) 58c and a Then Other Path set (TOP) 58d. The network node 50 also includes a routing resource 60 configured for generating the directed acyclic graph, described below, including generating the data structures 58a, 58b, 58c, and 58d.

Figure 7:
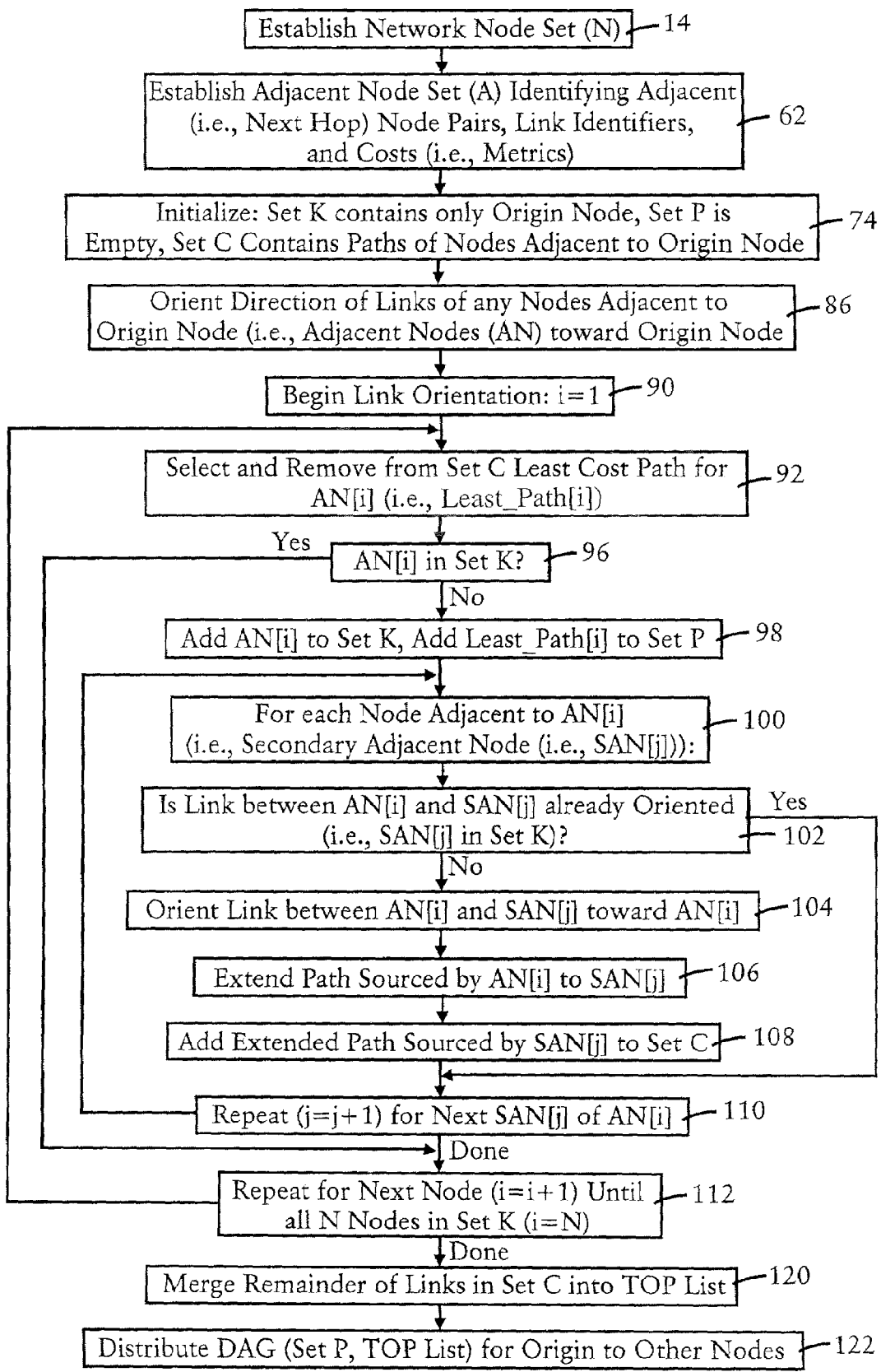
FIG. 7 is a diagram illustrating the method of calculating a directed acyclic graph based on orienting links for next hop paths and extended paths toward the network node, according to an embodiment of the present invention.

FIG. 7 is a diagram illustrating the method by the routing resource 60 of creating a directed acyclic graph 52, according to an embodiment of the present invention. The steps described in FIG. 7 can be implemented as executable code stored on a computer readable medium (e.g., a hard disk drive, a floppy drive, a random access memory, a read only memory, an EPROM, a compact disk, etc.).

Figure 2:
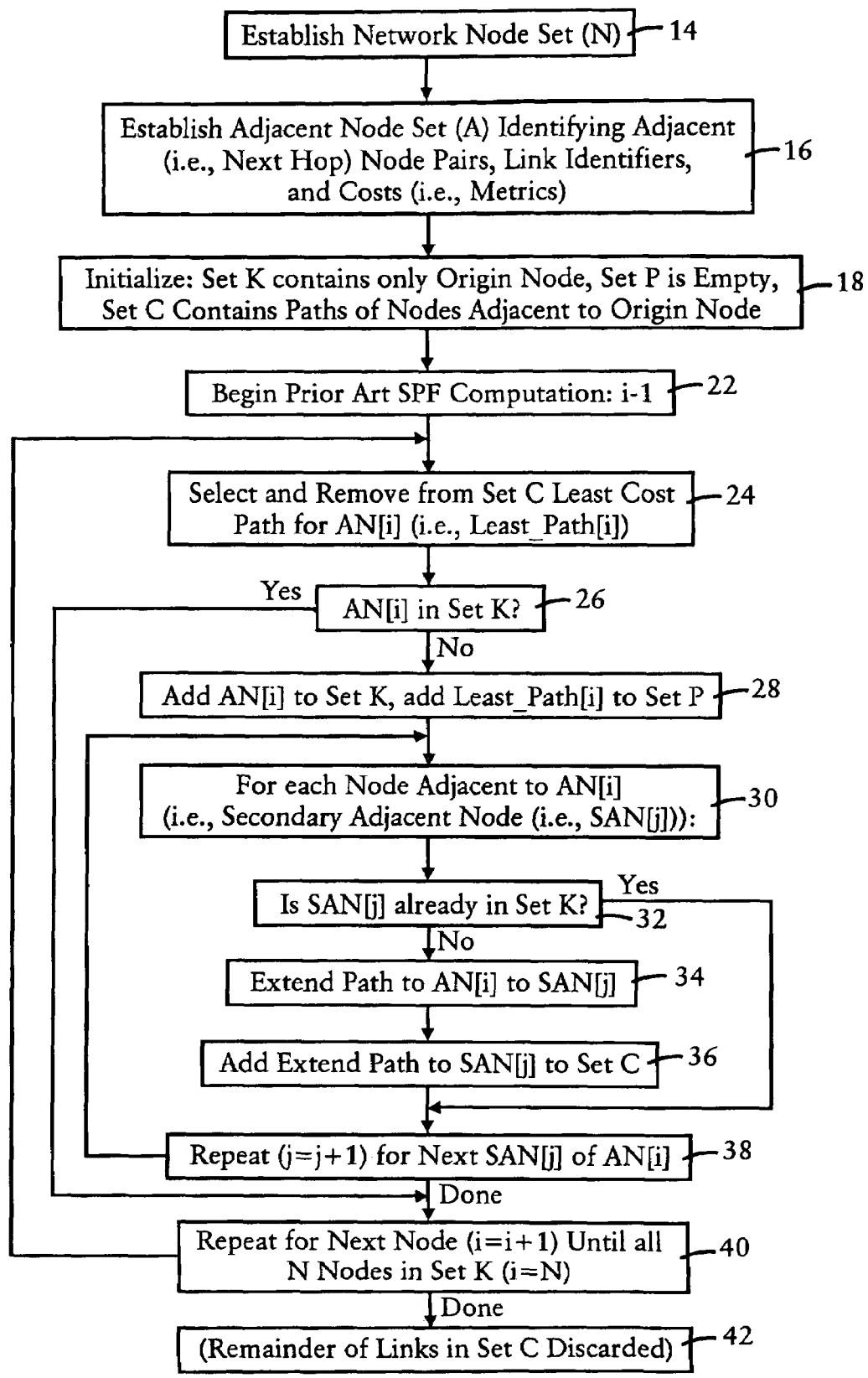
FIG. 2 is a (prior art) diagram illustrating a conventional technique for performing a shortest path first (SPF) computation for establishment of a routing topology for the mesh network of FIG. 1.

The method of FIG. 7 modifies the shortest path computation of FIG. 2 by identifying paths from all other nodes of the network 10 toward the network node 50 (i.e., the origin). As will become apparent from the description below, the method of FIG. 7 orients the direction of all links to any next hop nodes (i.e., adjacent nodes) toward the origin node 50, and orients the links between any adjacent node and secondary adjacent nodes back toward the adjacent node, resulting in extended paths that are oriented back toward the origin.

Figure 5:
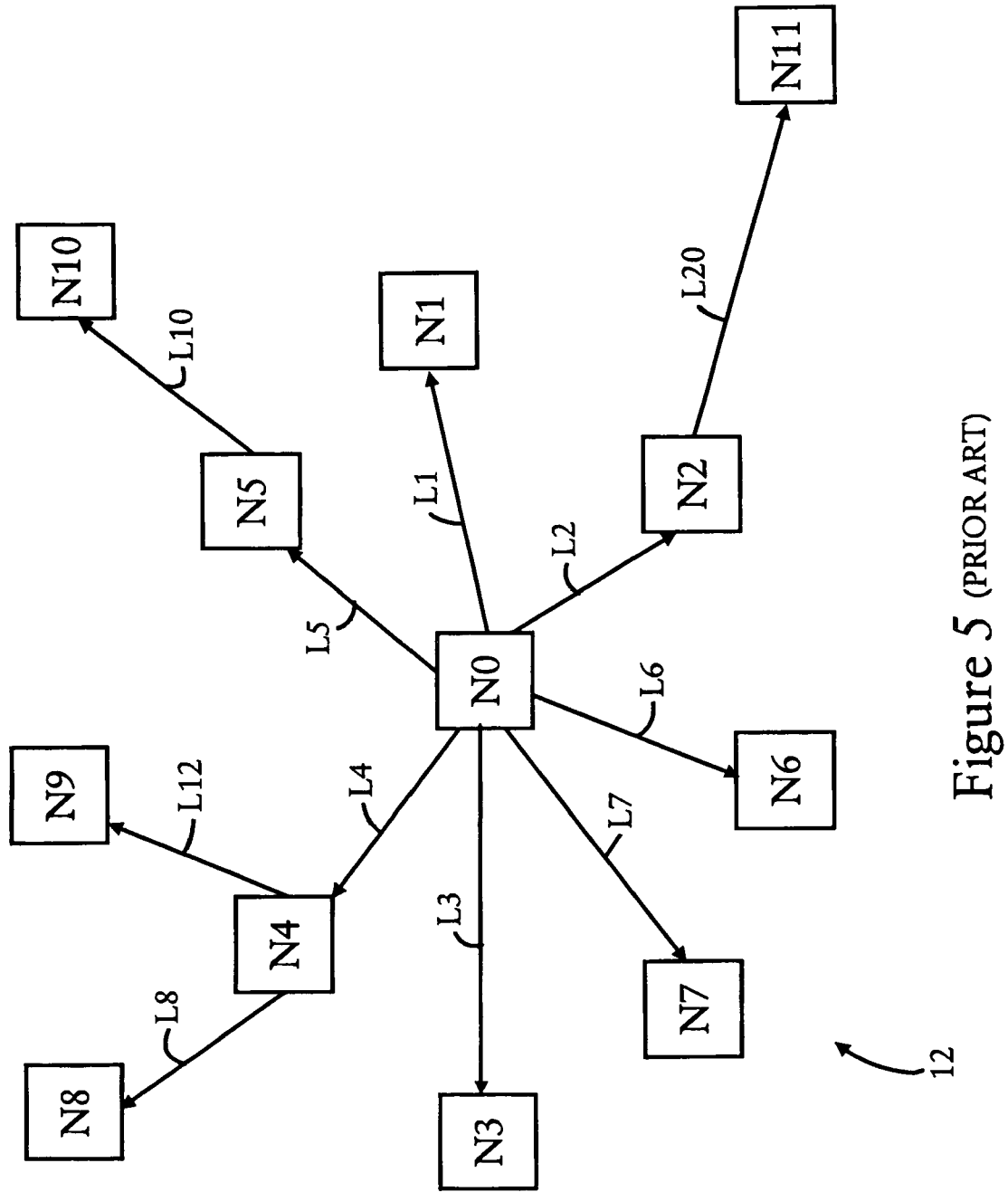
FIG. 5 is a (prior art) diagram illustrating a tree topology used for reaching the network nodes of FIG. 1 according to the chosen path set of FIG. 4.

Hence, rather than establishing the tree topology 12 of FIG. 5 based on identifying shortest paths to destinations via non-directional links, the method of FIG. 7 preserves all paths, and directs all links back toward the origin, resulting in the creation of the directed acyclic graph as illustrated in FIG. 11F.

The method of FIG. 7 begins with step 14, where the routing resource 60 establishes the same network node set (N) described with respect to FIG. 2: set N identifies the domain of nodes within the network 10 (i.e., N={N0, N1, N2, . . . N11}) based on received link state advertisement messages from nodes (e.g., N1, N2, . . . N11) throughout the network. The routing resource 60 initially establishes in step 62 the adjacent node set A 58a in the memory 56 of FIG. 6.

FIG. 8 is a diagram illustrating the node adjacency set 58a created by the routing resource 60. The node adjacency set 58a includes multiple adjacent node entries 64, each entry 64 identifying first and second adjacent nodes 66a and 66b (e.g., N0 and N1), the corresponding link 68 (e.g., "L1") that connects the first and second adjacent nodes 66a and 66b, and the corresponding metric (i.e., cost) 70 of the link (e.g., "1"). Each adjacent node entry 64 also optionally includes a direction field 72 that specifies an orientation (e.g., "0-1") of the corresponding link (e.g., "L1") specified in the link field 68, where the orientation "i-j" 72 indicates that the connecting link is oriented such that data from node "j" is directed toward node "i". For example, the first entry 64 in the node adjacency set 58a specifies the adjacent node pair N0 and N1 connected via link L1 at a cost of "1", where the direction "0-1" indicates that the link L1 is oriented from the node N1 toward the node N0.

As described below, the direction field 72 is optional in that the link orientation "i-j" may be stored alternatively in the candidate path set 58b; hence, the routing resource 60 simply needs to store in step 62 the fields 66a, 66b, 68, and 70 for each entry 64 of the node adjacency set 58a. If the direction field 72 also is to be inserted into the each entry 64, the direction field 72 will initially contain null values (indicating an absence of any orientation for the corresponding link 68), and will be updated during link orientation steps, described below. Hence, the network node set N and the adjacent node set A 58a as of step 62 initially represent the link state of the mesh network 10 of FIG. 1.

The routing resource 60 initializes the directed acyclic graph (DAG) computation in step 74 by initially inserting within a set K (defined as storing chosen nodes) only the origin network node N0 performing the computation (i.e., the "origin node") (N0 ∈ K), and emptying the set P 58c that defines chosen paths (P={ }). The set P 58c, illustrated in FIG. 10, is optional and used simply to list the shortest path first (i.e., least cost) paths upon the completion of the computation of FIG. 7; note, however, that the set P 58c can be disregarded if the DAG ordering based on metric and node identifier is not needed. Assuming the set P 58c is to be used, however, the routing resource 60 is configured for storing within the set P 58c: the source node of the path in N 78, the destination node in N (i.e., the origin N0) 80, the link identifier(s) 82 between the source and destination nodes 78 and 80, and aggregated path cost 76 (i.e., the cumulative cost of all links specified in field 82). As described above, the set P 58c is initially empty in step 74.

The routing resource of the node N0 also initializes in step 74 the candidate path set C 58b with the paths of nodes that are adjacent to the origin node N0. The candidate path set C 58b, illustrated in FIG. 9, includes the source node of the path in N 78, the destination node in N (i.e., the origin N0) 80, the link identifier(s) 82 between the source and destination nodes 78 and 80, and aggregated path cost 76 (i.e., the cumulative cost of all links specified in field 82). The routing resource 60 initially in step 74 adds the first candidate path entries 84 for each next-hop node (i.e., adjacent node) that is adjacent to the origin node 50. Hence, the set C is initially populated with the paths from the mobile router N0 to the mobile routers N1, N2, N3, N4, N5, N6, N7, N9, as illustrated by the added entries 84.

The routing resource 60 orients in step 86 the link orientation of each of the links 82 in the first candidate path entries 84 toward the origin 50 (i.e., N0), by inserting the direction "0-j" in the direction field 72, where "j" is the corresponding next-hop node (e.g., N1, N2, N3, N4, N5, N6, N7, N9). As apparent from the foregoing, the direction field 72 may be inserted in either the node adjacency set 58a of FIG. 8, the candidate set 58b of FIG. 9, or both. The orientation 72 of the links 82 in the first candidate path entries 84 results in the initial topology 88a of FIG. 11A, where the adjacent nodes N1, N2, N3, N4, N5, N6, N7, and N9 have respective oriented links L1 (0-1), L2 (0-2), L3 (0-3), L4 (0-4), L5 (0-5), L6 (0-6), L7 (0-7), and L9 (0-9).

The routing resource 60 begins link orientation in step 90 by selecting the first adjacent node AN[i=1], namely N1 for attempted path extension to any secondary adjacent nodes that are adjacent to the first adjacent node N1. Assuming the set P 58*c* is to be used, the least cost path (Least_Path[i]) is removed in step 92 from the candidate set C, illustrated as event 92*a*; note, however, if the set P 58*c* is not to be used, then the entry for N1 is preserved in the candidate set C 58*b*, in which case a not shortest (NS) flag 94 can be used to distinguish between shortest paths and alternate paths for source nodes 78 to the destination 80.

If in step 96 the selected adjacent node AN[i=1] (e.g., N1) is not already a member of the set K, the routing resource 60 adds in step 98 the selected adjacent node AN[i=1] to the set K of chosen nodes (N1 ∈ K), and if the set P 58*c* is in use, adds the least cost path Least_Path[i] to the set P 58*c* of FIG. 10, for example as entry 98*a*.

The routing resource 60 selectively adds a second candidate path entry, for each secondary adjacent node SAN[j] having a link that has not already been oriented. In particular, the routing resource 60 selects in step 100 one of the secondary adjacent nodes SAN[j] (e.g., N2) that is among the secondary adjacent nodes (e.g., N2, N5, or N11) that is a single hop from the selected next-hop node AN[i] (N1). If in step 102 the routing resource 60 determines that the link 68 (e.g., L21) between the selected next-hop node AN[i=1] (N1) and the selected secondary adjacent node SAN[j=1] (N2) is not already oriented (for example, as L1 (0-1) in FIG. 11A), the link 68 (e.g., L21) between the selected next-hop node AN[i=1] (N1) and the selected secondary adjacent node SAN [j=1] (N2) is oriented in step 104 toward the selected next-hop node AN[i=1] (N1), as illustrated in FIG. 11B by the link L21 (1-2), and the directional fields 72 associated with the entries for the node pairs N1-N2 via link L21 in the node adjacency set 58*a* of FIG. 8 and the candidate path set 58*b*.

The routing resource 60 also creates a new entry in the candidate path 58*b* that extends in step 106 the path sourced by the selected next-hop node AN[i=1] (N1) (e.g., as illustrated by the first entry of FIG. 9) to the selected secondary adjacent node SAN[j=1] (N2), such that the selected secondary adjacent node SAN[j=1] (N2) is the new path source 78 to the destination N0. Hence, the routing resource 60 adds in step 108 a second candidate path entry (e.g., 108$a_1$) specifying that the path sourced by the node N2 can reach the destination N0 via the path having directional links L21 (1-2) and L1 (0-1).

The routing resource 60 repeats in step 110 the path extension from the next-hop node AN[i=1] (N1) for each of the adjacent nodes N5 and N11, resulting in the addition of the respective second candidate path entries 108$a_2$ and 108$a_3$. The addition of the second candidate path entries 108$a_1$, 108$a_2$ and 108$a_3$ results in the topology illustrated in FIG. 11B, where nodes N2, N5, and N11 have a path to the origin N0 via the next-hop node N1.

As apparent from the foregoing, the origin node N0 is not selected as a secondary adjacent node to the next-hop node N1 because the corresponding link L1 (0-1) already has been oriented. Hence, the previous orientation ensures no loops are introduced into the DAG.

The routing resource 60 repeats in step 112 the path extension for the subsequent next-hop node AN[i=i+1], until all the nodes N have been accounted for. Hence: entries 108*b* of FIG. 9 and FIG. 11C illustrate path extension of nodes N6 and N11 via N2; and entries 108*c* of FIG. 9 and FIG. 11D illustrate path extension of nodes N4, N7 and N8 via N3.

As illustrated in FIG. 11E, entries 108*d*, 108*e*, and 108*f* illustrate path extensions via respective next-hop nodes N4, N5, and N6. No path extensions are executed via N7 because all adjacent nodes to N7 (N0, N3, N6) have links that already have been oriented.

The entries 108*g*, 108*h*, and 108*i* illustrate path extensions via the respective next-hop nodes N8, N9, and N10 of FIG. 9, illustrated in FIG. 11F in the final DAG topology 52.

As apparent from the foregoing, the automatic ordering of the entries in the candidate list 58*b* provides an ordered list of paths from each of the other network nodes (N1 through N11) toward the source N0, ordered solely by least cost. Hence, the candidate list 58*b* itself represents the DAG topology 52, where the routing resource 60 can tag entries as not shortest (NS) in field 94 in order minimize processing when the candidate list is distributed to the other nodes.

However, as described above, the shortest path set P 58*c* and the Then Other Path set 58*d* can be used as an alternative to the candidate list 58*b*, where the paths are ordered by lowest cost 76 in combination with the source node 78. In this case, the routing resource 60, after having moved the shortest path entries into the shortest path set P 58*c*, merges in step 120 the remainder of the links (that were not deleted in step 92 for all nodes N[i=1 to N]) from the candidate set 58*b* into the Then Other Path set 58*d*, and outputs in step 122 the DAG 52, either as the candidate set 58*b* or the sets P 58*c* and TOP 58*d*.

As apparent from the foregoing, each network node can perform its own DAG computation based on its own preferred metrics, and distribute its DAG results to the other nodes in the network. Hence, a DAG computation can be performed according to the disclosed embodiment in a distributed manner based on metrics selected by the DAG destination node, with minimal modifications to existing SPF computation resources. Hence, the disclosed embodiment enables the use of DAG computation in OSPF and IS-IS systems, for load balancing among multiple paths with minimal modification to existing systems.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for creating a directed acyclic graph by a network node of a network, the method including:

storing, by the network node, adjacent node entries in the network node and identifying links to other network nodes in the network, each adjacent node entry identifying first and second adjacent nodes of the network, the link connecting the corresponding first and second adjacent nodes, and a corresponding cost of the link, at least one of the adjacent node entries identifying the network node and a next-hop node that is adjacent to the network node;

adding, by the network node to a candidate path data structure in the network node, a first candidate path entry for each next-hop node and that specifies a first path between the network node and the corresponding next-hop node via the corresponding link at the corresponding cost, and orienting a link orientation of the corresponding link toward the network node, selectively adding, by the network node for each next-hop node, a second candidate path entry to the candidate path data structure, for each secondary adjacent node that is adjacent to the corresponding one next-hop node, based on a determined absence of orientation of the corresponding link between the corresponding secondary adjacent node and the corresponding one next-hop node, the second candidate path entry specifying a corresponding extended path that extends the corresponding first path of the corresponding one next-hop node to between the network node and the corresponding secondary adjacent node based on:

(1) adding the link and cost of the corresponding adjacent node entry specifying the secondary adjacent node and the corresponding one next-hop node with the respective link and cost of the corresponding first candidate entry, and (2) orienting the link connecting the secondary adjacent node and the corresponding one next-hop node toward the corresponding one next-hop node; and the network node distributing the directed acyclic graph to the other network nodes for transmission of packets to the network node, the directed acyclic graph specifying the first paths, the extended paths, and the oriented links for enabling every one of the other network nodes to reach the network node.

2. The method of claim 1, wherein the link orientation for each corresponding link is specified within the corresponding adjacent node entry.

3. The method of claim 1, wherein the link orientation for each corresponding link is specified within each entry in the candidate path data structure that specifies the corresponding link.

4. The method of claim 1, wherein the selectively adding includes completing adding the second candidate path entries, for said each secondary adjacent node that is adjacent to the corresponding one next-hop node, prior to beginning adding the second candidate path entries associated with a subsequent one of the next-hop nodes.

5. The method of claim 1, further comprising creating a second data structure representing the directed acyclic graph, the second data structure including:

shortest path first entries, each identifying a shortest path from the candidate path data structure for a corresponding identified one of the other network nodes to reach the network node; and alternate path entries, each identifying an alternate paths from the candidate path data structure for an identified one of the other network nodes to reach the network node, the shortest path first entries and the alternate path entries corresponding to the first and candidate path entries sorted by cost and other node identifier.

6. A network node in a network, the network node comprising:

a memory structure configured for storing adjacent node entries and a candidate path data structure;

a routing resource configured for creating a directed acyclic graph enabling other network nodes in the network to reach the network node, based on:

(1) storing the adjacent node entries identifying links to the other network nodes in the network, each adjacent node entry identifying first and second adjacent nodes of the network, the link connecting the corresponding first and second adjacent nodes, and a corresponding cost of the link, at least one of the adjacent node entries identifying the network node and a next-hop node adjacent to the network node;

(2) adding, to the candidate path data structure, a first candidate path entry for each next-hop node and that specifies a first path between the network node and the corresponding next-hop node via the corresponding link at the corresponding cost, and orienting a link orientation of the corresponding link toward the network node by storing the link orientation within the memory structure, (3) selectively adding, for each next-hop node, a second candidate path entry to the candidate path data structure, for each secondary adjacent node that is adjacent to the corresponding one next-hop node, based on a determined absence of orientation of the corresponding link between the corresponding secondary adjacent node and the corresponding one next-hop node, the second candidate path entry specifying a corresponding extended path that extends the corresponding first path of the corresponding one next-hop node to between the network node and the corresponding secondary adjacent node based on:

(a) adding the link and cost of the corresponding adjacent node entry specifying the secondary adjacent node and the corresponding one next-hop node with the respective link and cost of the corresponding first candidate entry, and (b) orienting the link connecting the secondary adjacent node and the corresponding one next-hop node toward the corresponding one next-hop node by storing the link orientation within the memory structure; and a network interface configured for distributing the directed acyclic graph to the other network nodes for transmission of packets to the network node, the directed acyclic graph specifying the first paths, the extended paths, and the oriented links for enabling every one of the other network nodes to reach the network node.

7. The network node of claim 6, wherein the link orientation for each corresponding link is specified within the corresponding adjacent node entry.

8. The network node of claim 6, wherein the link orientation for each corresponding link is specified within each entry in the candidate path data structure that specifies the corresponding link.

9. The network node of claim 6, wherein the routing resource is configured for completing adding the second candidate path entries, for said each secondary adjacent node that is adjacent to the corresponding one next-hop node, prior to beginning adding the second candidate path entries associated with a subsequent one of the next-hop nodes.

10. The network node of claim 6, wherein the routing resource is further configured for storing in the memory structure a second data structure representing the directed acyclic graph, the second data structure including:

shortest path first entries, each identifying a shortest path from the candidate path data structure for a corresponding identified one of the other network nodes to reach the network node; and alternate path entries, each identifying an alternate paths from the candidate path data structure for an identified one of the other network nodes to reach the network node, the shortest path first entries and the alternate path entries corresponding to the first and candidate path entries sorted by cost and other node identifier.

11. A computer readable medium having stored thereon sequences of computer executable instructions for a network node of a network to create a directed acyclic graph, the sequences of instructions including instructions for:

storing, by the network node, adjacent node entries in the network node and identifying links to other network nodes in the network, each adjacent node entry identifying first and second adjacent nodes of the network, the link connecting the corresponding first and second adjacent nodes, and a corresponding cost of the link, at least one of the adjacent node entries identifying the network node and a next-hop node that is adjacent to the network node;

adding, by the network node to a candidate path data structure in the network node, a first candidate path entry for each next-hop node and that specifies a first path between the network node and the corresponding next-hop node via the corresponding link at the corresponding cost, and orienting a link orientation of the corresponding link toward the network node, selectively adding, by the network node for each next-hop node, a second candidate path entry to the candidate path data structure, for each secondary adjacent node that is adjacent to the corresponding one next-hop node, based on a determined absence of orientation of the corresponding link between the corresponding secondary adjacent node and the corresponding one next-hop node, the second candidate path entry specifying a corresponding extended path that extends the corresponding first path of the corresponding one next-hop node to between the network node and the corresponding secondary adjacent node based on:

(1) adding the link and cost of the corresponding adjacent node entry specifying the secondary adjacent node and the corresponding one next-hop node with the respective link and cost of the corresponding first candidate entry, and (2) orienting the link connecting the secondary adjacent node and the corresponding one next-hop node toward the corresponding one next-hop node; and the network node distributing the directed acyclic graph to the other network nodes for transmission of packets to the network node, the directed acyclic graph specifying the first paths, the extended paths, and the oriented links for enabling every one of the other network nodes to reach the network nodes.

12. The medium of claim 11, wherein the link orientation for each corresponding link is specified within the corresponding adjacent node entry.

13. The medium of claim 11, wherein the link orientation for each corresponding link is specified within each entry in the candidate path data structure that specifies the corresponding link.

14. The medium of claim 11, wherein the selectively adding includes completing adding the second candidate path entries, for said each secondary adjacent node that is adjacent to the corresponding one next-hop node, prior to beginning adding the second candidate path entries associated with a subsequent one of the next-hop nodes.

15. The medium of claim 11, further comprising instructions for creating a second data structure representing the directed acyclic graph, the second data structure including:

shortest path first entries, each identifying a shortest path from the candidate path data structure for a corresponding identified one of the other network nodes to reach the network node; and alternate path entries, each identifying an alternate paths from the candidate path data structure for an identified one of the other network nodes to reach the network node, the shortest path first entries and the alternate path entries corresponding to the first and candidate path entries sorted by cost and other node identifier.

16. A network node in a network, the network node comprising:

memory means for storing adjacent node entries and a candidate path data structure;

routing means for creating a directed acyclic graph enabling other network nodes in the network to reach the network node, based on:

(1) storing the adjacent node entries identifying links to the other network nodes in the network, each adjacent node entry identifying first and second adjacent nodes of the network, the link connecting the corresponding first and second adjacent nodes, and a corresponding cost of the link, at least one of the adjacent node entries identifying the network node and a next-hop node that is adjacent to the network node;

(2) adding, to the candidate path data structure, a first candidate path entry for each next-hop node and that specifies a first path between the network node and the corresponding next-hop node via the corresponding link at the corresponding cost, and orienting a link orientation of the corresponding link toward the network node by storing the link orientation within the memory means, (3) selectively adding, for each next-hop node, a second candidate path entry to the candidate path data structure, for each secondary adjacent node that is adjacent to the corresponding one next-hop node, based on a determined absence of orientation of the corresponding link between the corresponding secondary adjacent node and the corresponding one next-hop node, the second candidate path entry specifying a corresponding extended path that extends the corresponding first path of the corresponding one next-hop node to between the network node and the corresponding secondary adjacent node based on:

(a) adding the link and cost of the corresponding adjacent node entry specifying the secondary adjacent node and the corresponding one next-hop node with the respective link and cost of the corresponding first candidate entry, and (b) orienting the link connecting the secondary adjacent node and the corresponding one next-hop node toward the corresponding one next-hop node by storing the link orientation within the memory means; and means for distributing the directed acyclic graph to the other network nodes for transmission of packets to the network node, the directed acyclic graph specifying the first paths, the extended paths, and the oriented links for enabling every one of the other network nodes to reach the network node.

17. The network node of claim 16, wherein the link orientation for each corresponding link is specified within the corresponding adjacent node entry.

18. The network node of claim 16, wherein the link orientation for each corresponding link is specified within each entry in the candidate path data structure that specifies the corresponding link.

19. The network node of claim 16, wherein the routing means is configured for completing adding the second candidate path entries, for said each secondary adjacent node that is adjacent to the corresponding one next-hop node, prior to beginning adding the second candidate path entries associated with a subsequent one of the next-hop nodes.

20. The network node of claim 16, wherein the routing means is further configured for storing in the memory means a second data structure representing the directed acyclic graph, the second data structure including:

shortest path first entries, each identifying a shortest path from the candidate path data structure for a corresponding identified one of the other network nodes to reach the network node; and alternate path entries, each identifying an alternate paths from the candidate path data structure for an identified one of the other network nodes to reach the network node, the shortest path first entries and the alternate path entries corresponding to the first and candidate path entries sorted by cost and other node identifier.

* * * * *

UNITED STATES PATENT AND TRADEMARK OFFICE
CERTIFICATE OF CORRECTION

PATENT NO. : 7,656,857 B2
APPLICATION NO. : 11/251765
DATED : February 2, 2010
INVENTOR(S) : Thubert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Twenty-eighth Day of December, 2010

David J. Kappos
*Director of the United States Patent and Trademark Office*